(12) United States Patent
Ahn (10) Patent No.: US 9,658,706 B2
(45) Date of Patent: May 23, 2017

(54) TOUCH PANEL

(71) Applicant: LG INNOTEK CO., LTD., Seoul (KR)

(72) Inventor: Ji Sung Ahn, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 59 days.

(21) Appl. No.: 14/087,536

(22) Filed: Nov. 22, 2013

(65) Prior Publication Data

US 2014/0146245 A1    May 29, 2014

(30) Foreign Application Priority Data

Nov. 23, 2012  (KR) .................. 10-2012-0133890

(51) Int. Cl.
*G06F 3/041* (2006.01)
*G06F 3/042* (2006.01)

(52) U.S. Cl.
CPC ............. *G06F 3/041* (2013.01); *G06F 3/0421* (2013.01); *G06F 2203/04101* (2013.01); *G06F 2203/04106* (2013.01)

(58) Field of Classification Search
CPC ........ G06F 3/0421; G06F 3/044; G06F 3/041; G06F 2203/04101; G06F 2203/04106
USPC .................................. 345/175, 174
See application file for complete search history.

(56) References Cited

U.S. PATENT DOCUMENTS

| 8,008,613 | B2* | 8/2011 | Tam .............................. 250/226 |
| 8,731,618 | B2* | 5/2014 | Jarvis et al. .................. 455/566 |
| 8,912,480 | B2* | 12/2014 | Pope et al. .................... 250/221 |
| 2008/0006762 | A1* | 1/2008 | Fadell et al. ................ 250/201.1 |
| 2008/0158173 | A1* | 7/2008 | Hamblin et al. .............. 345/173 |
| 2010/0066650 | A1* | 3/2010 | Lee et al. ......................... 345/64 |
| 2010/0124945 | A1* | 5/2010 | Hwang et al. ................ 455/566 |
| 2011/0242057 | A1 | 10/2011 | Lee et al. |
| 2012/0162106 | A1* | 6/2012 | Choi ..................... G06F 1/1626 345/173 |
| 2014/0002378 | A1* | 1/2014 | Kim et al. .................... 345/173 |

(Continued)

FOREIGN PATENT DOCUMENTS

TW      M391689 U1    11/2010
TW      201142416 A    12/2011

(Continued)

OTHER PUBLICATIONS

Office Action dated Jun. 11, 2015 in Taiwanese Application No. 102142612.

*Primary Examiner* — Lun-Yi Lao
*Assistant Examiner* — Kelly Hegarty
(74) *Attorney, Agent, or Firm* — Saliwanchik, Lloyd & Eisenschenk (57) ABSTRACT

A touch panel according to the embodiment includes a cover window including an active area and an unactive area; a print layer on the unactive area; a sensing part on the unactive area to emit light toward the print layer; and a first light receiving part on the print layer to receive the light, wherein the print layer includes a first print layer on the cover window; a second print layer formed on the first print layer while forming a step difference with respect to the first print layer; and a third print layer formed on the second print layer while filling the step difference.

9 Claims, 6 Drawing Sheets

(56) References Cited

U.S. PATENT DOCUMENTS

2014/0132569 A1* 5/2014 Lien .................. G06F 3/041
                                                    345/175

FOREIGN PATENT DOCUMENTS

TW          201206279 A    2/2012
TW          M424511 U1     3/2012

* cited by examiner

TOUCH PANEL

CROSS-REFERENCE TO RELATED APPLICATION

This application claims the benefit under 35 U.S.C. §119 of Korean Patent Application No. 10-2012-0133890, filed Nov. 23, 2012, which is hereby incorporated by reference in its entirety.

BACKGROUND

The embodiment relates to a touch panel.

Recently, a touch panel, which performs an input function through the touch of an image displayed on a display device by an input device such as a stylus pen or a hand, has been applied to various electronic appliances.

The touch panel may be representatively classified into a resistive touch panel and a capacitive touch panel. In the resistive touch panel, the position of the touch point is detected by detecting the variation of resistance according to the connection between electrodes when pressure is applied to an input device. In the capacitive touch panel, the position of the touch point is detected by detecting the variation in capacitance when a finger of the user is touched on the capacitive touch panel between electrodes. When taking of the convenience of a fabrication scheme and a sensing power, recently, the capacitive touch panel has been spotlighted in a smaller model.

The touch panel may include a cover window including an AA (Active Area) and an UA (Unactive Area) or a substrate. A sensing electrode for sensing an input device is provided in the AA. A print layer and a wire electrode are formed in the UA.

Specifically, a proximity sensor for sensing a distance of an object may be disposed in the UA. The proximity sensor may be disposed on the print layer in the UA of the touch panel. In addition, the proximity sensor includes a light emitting part and a light receiving part and measures the quantity of light emitted from the light emitting part and the quality of light incident on the light receiving part, such that the proximity sensor may measure the distance of an object approaching thereto.

However, when the print layer disposed in the UA is a white printed layer, the light emitted from the sensing part is scattered to be unintentionally incident upon the light receiving part, so that an error may occur in the operation of the proximity sensor.

Thus, a new touch panel is required to reduce the scattered reflection of light emitted from and incident on the proximity sensor.

BRIEF SUMMARY

The embodiment provides a touch panel representing improved reliability.

According to the embodiment, there is provided an touch panel including a cover window including an active area and an unactive area; a print layer on the unactive area a sensing part on the unactive area to emit light toward the print layer; and a first light receiving part on the print layer to receive the light, wherein the print layer includes a first print layer on the cover window; a second print layer formed on the first print layer while forming a step difference with respect to the first print layer; and a third print layer formed on the second print layer while filling the step difference.

According to the touch panel, the black print layer is disposed to fill the step difference of white print layer, so that the quantity of infrared light emitted from the sensing part and scattered on the white print layer may be reduced. That is, according to the touch panel of the embodiment, when the light emitted from the light emitting part of the sensing part is incident on the first light receiving part of the print layer, the scattered reflection may be reduced due to the white print layer, so that undesired light may be inhibited from being incident on the second light receiving part due to the scattered reflection.

Thus, the touch panel according to the embodiment may reduce errors of the sensing part, so that the reliability of the touch panel may be substantially improved.

DETAILED DESCRIPTION

In the following description of the embodiments, it will be understood that, when a layer (or film), a region, a pattern, or a structure is referred to as being "on" or "under" another substrate, another layer for film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, the embodiments will be described with reference to the accompanying drawings.

Referring to FIGS. 1 to 4, a touch panel according to the embodiment may include a cover window 100, a print layer 200 provided on the cover window 100, a sensing part 400 provided on the cover window 100 and a first light receiving part 300 provided on the print layer 200.

The cover window 100 may include glass or plastic. For example, the cover window 100 may include strengthened glass, half-strengthened glass, sodalime glass, strengthened plastic, flexible plastic.

The cover window 100 may include an active area AA and an unactive area UA. The AA refers to an area through which a touch instruction may be input by a user. The active area AA refers to an area through which a touch instruction may be input by a user. To the contrary to the active area AA, the unactive area. UA signifies an area to which the touch instruction is not input because the unactive area UA is not activated even if the touch of the user is input thereto Electrodes may be provided on the AA of the cover window 100. In detail, a sensing electrode 500 may be provided on the active area AA of the cover window 100.

The print layer 200 may be provided on the unactive area UA of the cover window 100. In detail, first to third print layers 210 to 230 may be provided on the unactive area UA of the cover window 100.

The first to third print layers 210 to 230 may be sequentially stacked on the unactive area UA of the cover window 100. In addition, the first to third print layers 210 to 230 may be disposed to have step differences.

The sensing part 400 for emitting light toward the print layer may be provided. on the unactive area LA of the cover window. In detail, the sensing part 400 may emit infrared light toward the print layer. In more detail, the sensing part 400 may include a light emitting part 410 for emitting light and a second receiving part 420 for receiving light.

The print layer 200 may include a light receiving area for receiving the incident light emitted from the sensing part 400. In detail, the print layer 200 may include a first light receiving part 300 for receiving the infrared light emitted from the sensing part 400. In more detail, after the print layer 200 is disposed on the cover window 100, the light receiving area may be formed by patterning the print layer 200 and then, the light receiving area may be filled with infrared ink. That is, the first light receiving part 300 may be disposed between the print layers 200 and may be filled with the infrared ink.

The first light receiving part 300 may reflect the light emitted from the sensing part 400. That is, the light emitting part 410 of the sensing part 400 may emit light toward the first light receiving part 300 and the first light receiving part 300 may reflect the incident infrared light toward the second light receiving part 420 of the sensing part 400.

Thus, the sensing part 400 may measure or control a distance of an object of approaching to the touch panel according to the quantities of emitted light and incident light. The sensing part 400 may be a proximity sensor.

The infrared light emitted from the sensing part 400 may be incident on the first light receiving part 300 and the print layer 200. In this case, when the print layer 200 includes a white tone color, the scattered reflection is more increased so that undesired light is incident onto the second light receiving part 420 of the sensing part 400, thereby deteriorating the reliability of the sensing part 400.

Thus, according to the touch panel of the embodiment, the shape of the print layer is modified so that the scattered reflection may be reduced due to the print layer.

Figure 3:
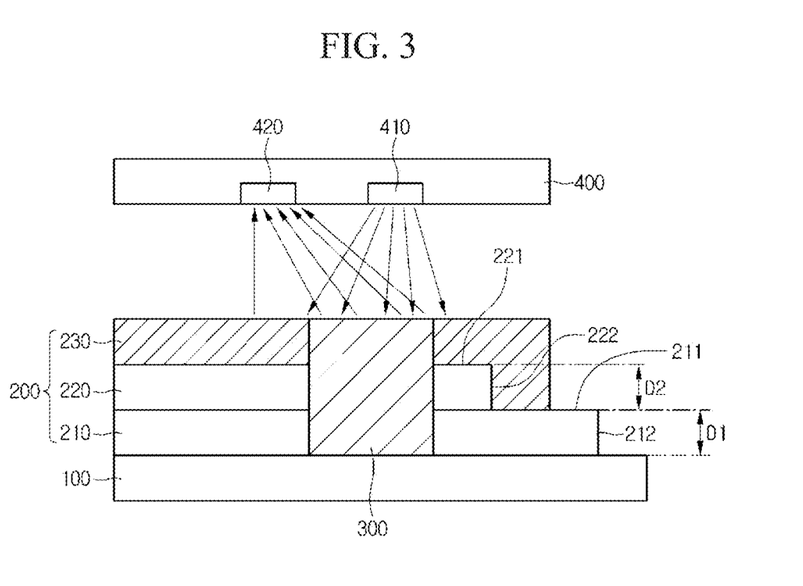
FIG. 3 is a sectional view taken along line A-A' of FIG. 2.
Figure 4:
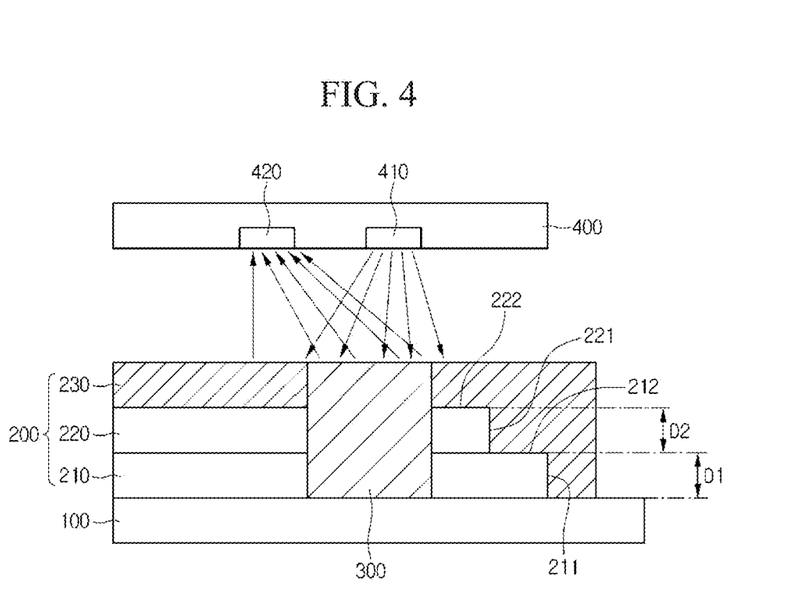
FIG. 4 is another sectional view taken along line A-A' of FIG. 2.

In detail, the print layer 200 according to the embodiment may include the first print layer 210 provided on the cover window 100, the second print layer 220 provided on the first print layer 210 and having a step difference between the first and second print layers 210 and 220, and the third print layer 230 provided on the second print layer while the step difference is filled.

In this case, the first and second print layers 210 and 220 may include a white print layer and the third print layer 230 may include a black print layer.

Due to the first print layer 210, a first step difference D1 may be formed between the first print layer 121 and the cover window 100. In detail, the first step difference D1 may be formed between the first print layer 121 and the cover window 100 corresponding to the thickness of the first print layer 210.

In addition, the width of the first print layer 210 may be different from that of the second print layer 220. Thus, the second step difference D2 may be formed between the first and second print layers 210 and 220 corresponding to the difference between widths of the first and second print layers 210 and 220.

The third print layer 230 is provided on the second print layer 220 while filling the first and/or second step difference(s) D1 and/or D2.

In detail, referring to FIG. 3, the third print layer 230 may be disposed to make contact with the top and side surfaces 221 and 222 of the second print layer 220 and the top surface 211 of the first print layer 210. Thus, the third print layer 230 may be arranged while filling the second step difference D2.

Further, referring to FIG. 4, the third print layer 230 may be disposed to make contact with the top and side surfaces 221 and 222 of the second print layer 220 and the top surface 211 and 212 of the first print layer 210. Thus, the third print layer 230 may be arranged while filling the first and second step differences D1 and D2.

Figure 5:
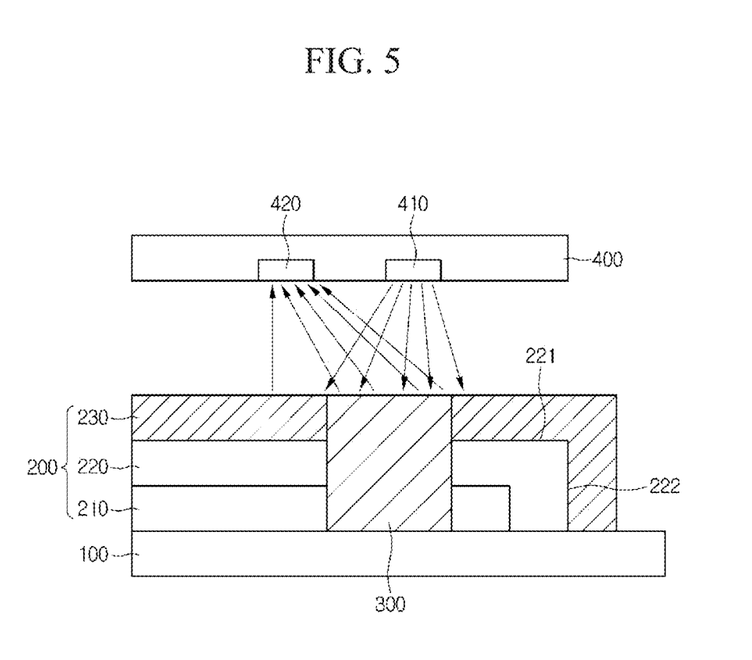
FIG. 5 is still another sectional view taken along line A-A' of FIG. 2.

In addition, referring to FIG. 5, the width of the first print layer 210 may be narrower than that of the second print layer 220. The third print layer 230 may be provided to make contact with the top and side surfaces 221 and 222 of the second print layer 220.

Since the third print layer 230 is provided to fill the first and/or second step difference D1 and/or D2, the exposed area of the white print layer in the print layer may be reduced. That is, since the third print layer 230 having a black color is arrange while filling the first and/or second print layer 210 and/or 220 having a white color, the while color is covered with the black color at the outer surface of the print layer, so that the white color area may be reduced.

Thus, when the infrared light is emitted from the sensing part 400, the quantity of light incident upon the white color portion of the print layer may be reduced. Therefore, the scattered reflection due to the white print layer may be reduced, so that the errors of the sensing part due to the scattered reflection may be reduced, thereby improving the reliability of the sensing part.

Figure 1:
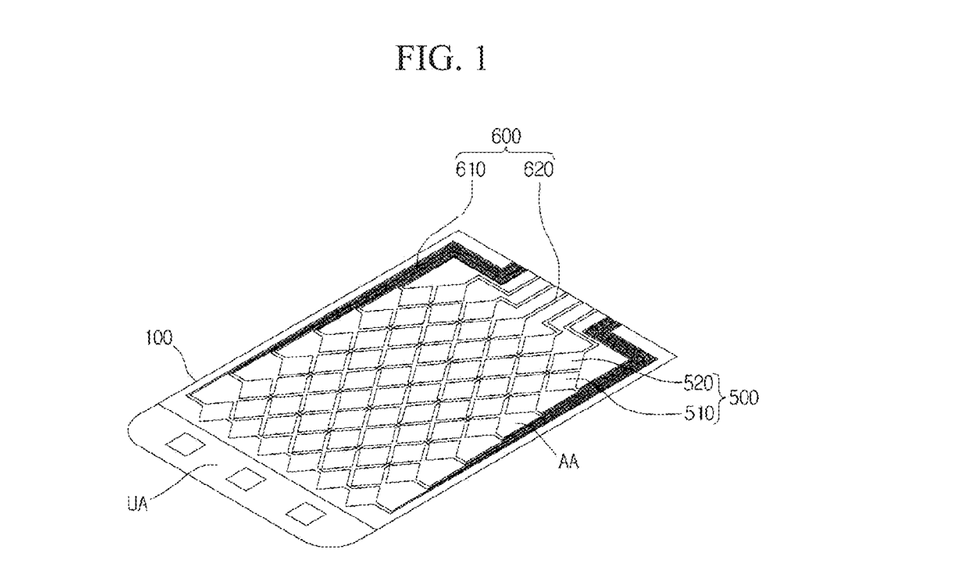
FIG. 1 is perspective view showing a touch panel according to an embodiment.
Figure 2:
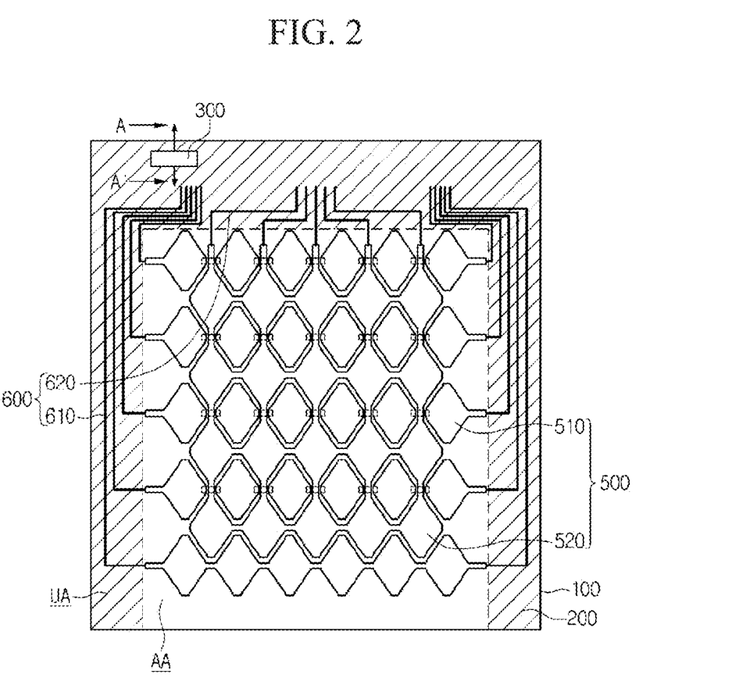
FIG. 2 is a top view showing a touch panel according to an embodiment.

The sensing electrode 500 may be provided on the active area AA of the cover window 100. In detail, the first and second sensing electrodes 510 and 520 may be disposed on one surface of the cover window 100. In more detail, the first sensing electrode 510 extending in one direction and the second electrode 520 extending in another direction may be disposed on the active area AA of the cover window 100.

The first and second sensing electrodes 510 and 520 may include a conductive material. For example, the first and second sensing electrodes 510 and 520 may include a transparent conductive material such as ITO (Indium Tin Oxide).

A wire electrode 600 may be disposed on the unactive area UA of the cover window 100. In detail, the wire electrode 600 may include a first wire electrode 610 withdrawn from the first sensing electrode 510 and a second wire electrode 620 withdrawn from the second sensing electrode 520.

The first and second wire electrodes 610 and 620 may include a metallic material. For example, the first wire electrodes 610 and 620 may include a metallic material such as Ag or Cu.

Figure 6:
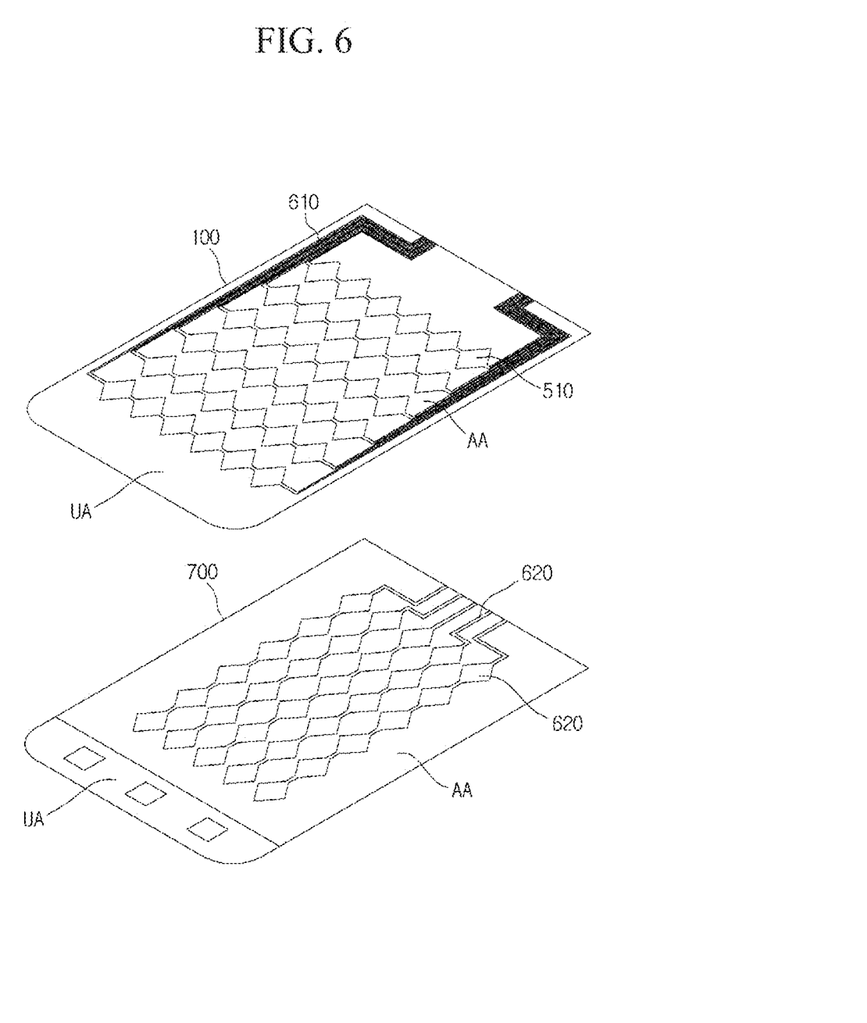
FIGS. 6 and 7 are perspective views showing a touch panel according to another embodiment.

FIGS. 5 and 6 show perspective views of a touch panel according to another embodiment.

Referring to FIGS. 5 and 6, the touch panel according to another embodiment may include a substrate disposed on the cover window. The substrate may include plastic. For example, the substrate may include plastic such as RET (Polyethylene Terephthalate).

Referring to FIG. 6, a substrate 700 may be provided on the cover window 100. The first sensing electrode 510 and the first wire electrode 610 may be disposed on one surface of the cover window 100, and the second sensing electrode 520 and the second wire electrode 620 may be provided on one surface of the substrate 700.

Figure 7:
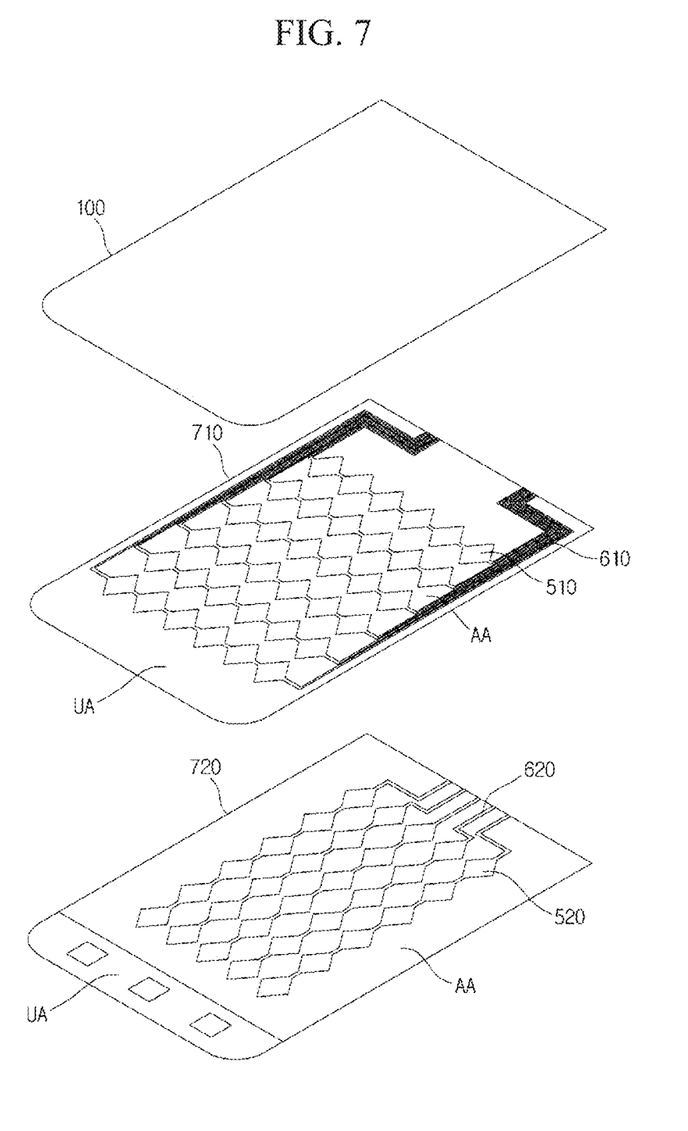

In addition, referring to FIG. 7, the first and second substrates 710 and 720 may be provided on the cover window 100. The first sensing electrode 510 and the first wire electrode 610 may be disposed on one surface of the first substrate 710, and the second sensing electrode 520 and the second wire electrode 620 may be disposed on one surface of the second substrate 720.

As described above, according to the touch panel of the embodiment, while the step difference of the white print layer is filled with the black print layer, the area of the white print layer exposed to an outer surface of the print layer may be reduced. Thus, the quantity of scattered reflection of the infrared light emitted from the sensing part due to the white print layer may be reduced.

That is, when the light emitted from the light emitting part of the sensing part is incident upon the first receiving part of the print layer, the scattered reflection due to the white print layer may be reduced, so that undesired light may be inhibited from being incident upon the second receiving part of the sensing part.

Thus, according to the touch panel of the embodiment, the errors of the sensing part due to the scattered reflection may be reduced, so that the reliability of the entire touch panel may be improved.

Figure 8:
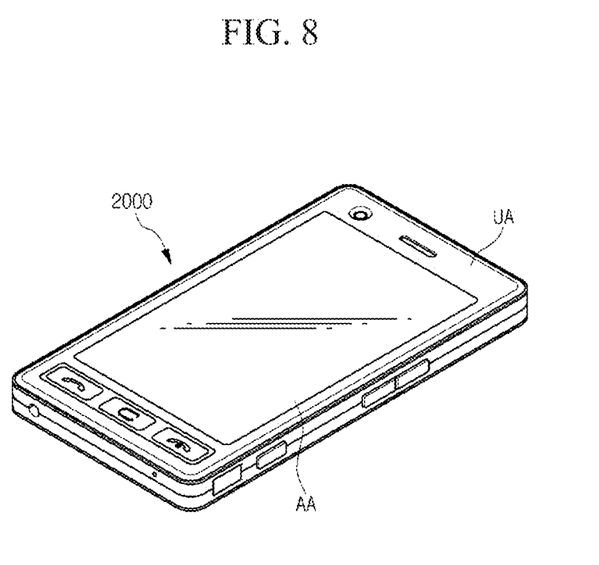
FIG. 8 is a view showing a display to which a touch panel according to an embodiment is applied.

FIG. 8 is a perspective view showing a portable terminal including the touch panel described above.

Referring to FIG. 8, the portable terminal 200 may include the active area AA and the unactive area UA. The touch signal by a touch with a finger is sensed in the active area AA, and a command icon pattern part and a log may be formed in the unactive area UA.

Although the portable terminal is depicted in FIG. 8 as one example, the electrode member and the touch panel may be used in various electronic products, such as a vehicle or a home appliance, to which a display is applied, as well as the portable terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
a cover window including an active area and an inactive area;
a print layer on the inactive area;
a sensing part on the inactive area to emit light toward the print layer; and
a first light receiving part on the print layer to receive the light,
wherein the print layer comprises:
a first print layer on the cover window;
a second print layer formed on the first print layer while forming a step difference with respect to the first print layer; and
a third print layer filling the step difference,
wherein the third print layer is disposed on the first and second print layers,
wherein the third print layer makes direct physical contact with the first and second print layers,
wherein the first print layer and the second print layer are white-color print layers,
wherein the third print layer is a black-color print layer,
wherein the sensing part comprises:
a light emitting part to emit the light to the first light receiving part; and
a second light receiving part onto which light reflected by the first light receiving part is incident;
wherein the first light receiving part and the print layer reflect the light emitted from the light emitting part,
wherein the third print layer is disposed to make contact with a top surface and a side surface of the second print layer and a top surface of the first print layer,
wherein the light emitting part only emits the light to the first light receiving part and the third print layer, and
wherein a thickness of the first light receiving part is the same as a sum of thicknesses of the first print layer, the second print layer, and the third print layer.

2. The touch panel of claim 1, wherein the first print layer has a width different from a width of the second print layer.

3. The touch panel of claim 2, wherein the width of the first print layer is larger than the width of the second print layer.

4. The touch panel of claim 2, wherein the width of the first print layer is smaller than the width of the second print layer, and
wherein the second print layer makes contact with top and side surfaces of the first print layer.

5. The touch panel of claim 1, wherein the first light receiving part comprises infrared ink.

6. The touch panel of claim 5, wherein the light emitting part emits infrared light.

7. The touch panel of claim 1, further comprising:
a first sensing electrode on the active area of the cover window, the first sensing electrode extending in one direction; and
a second sensing electrode on the active area of the cover window, the second sensing electrode extending in another direction.

8. The touch panel of claim 1, further comprising:
a substrate on the cover window;
a first sensing electrode on the cover window, the first sensing electrode extending in one direction; and
a second sensing electrode on the substrate, the second sensing electrode extending in another direction.

9. The touch panel of claim 1, further comprising:
a first substrate on the cover window;
a second substrate on the first substrate;

a first sensing electrode on the first substrate, the first sensing electrode extending in one direction; and a second sensing electrode on the second substrate, the second sensing electrode extending in another direction.

* * * * *